Figure 1:
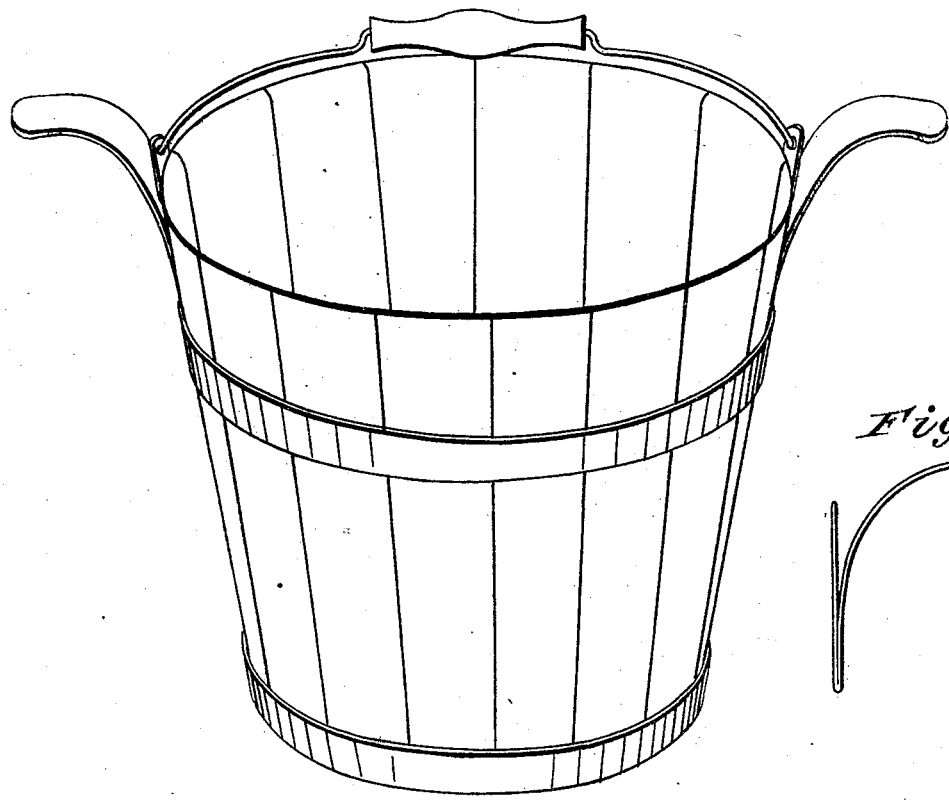
Figure 2:
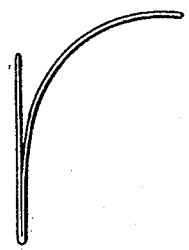

R. A. FISH.

Milk Pail.

No. 84,179.

Patented Nov. 17, 1868.

Witnesses:

Inventor:

RUFUS A. FISH, OF WORCESTER, MASSACHUSETTS.

*Letters Patent No. 84,179, dated November 17, 1868.*

IMPROVEMENT IN MILKING-PAILS.

The Schedule referred to in these Letters Patent and making part of the same.

*To all whom it may concern:*

Be it known that I, RUFUS A. FISH, of Worcester, in the county of Worcester, in the State of Massachusetts, have invented a new Improvement in Milking-Pails; and I do hereby declare that the following is a full and exact description thereof, reference being had to the accompanying drawings, and to the letters of reference marked thereon.

The nature of my invention consists in overcoming the objections to the old-style pail, which often slips from between the knees while milking unruly animals.

There are springs made of steel, and tempered, and firmly fastened to the pail, the lower portions of which project above the rim of the pail, with an aperture in them, through which the bail passes. Said springs can be attached either in front or rear of the ears of any ordinary pail in use, and can also be fastened to a hoop, and firmly secured to the pail in the usual manner of hooping. These springs can also be constructed of iron, or other metal, or of wood, or their equivalents, arranged substantially in the manner described, and for the purpose set forth.

Now what I claim as my invention, and desire to secure by Letters Patent, is—

The manner of securing the pail while milking, by allowing its weight to rest upon the knees, on the curved springs A A.

RUFUS A. FISH.

Witnesses:
WM. B. MAXWELL,
JEREMIAH SWASEY.